US012493509B2

(12) United States Patent
Abhishek et al.

(10) Patent No.: US 12,493,509 B2
(45) Date of Patent: Dec. 9, 2025

(54) FAULT INTERFACE ARCHITECTURE IN SAFETY-RELEVANT SYSTEMS

(71) Applicant: NXP USA, Inc., Austin, TX (US)

(72) Inventors: Kumar Abhishek, Bee Cave, TX (US); Vivek Kumar Yadav, Austin, TX (US); Sanjaykumar Hansrajbhai Kakasaniya, Austin, TX (US); Vikram Joshi, Austin, TX (US); Joseph Rollin Wright, Round Rock, TX (US)

(73) Assignee: NXP USA, Inc., Austin, TX (US)

( * ) Notice: Subject to any disclaimer, the term of this patent is extended or adjusted under 35 U.S.C. 154(b) by 98 days.

(21) Appl. No.: 18/388,391

(22) Filed: Nov. 9, 2023

(65) Prior Publication Data

US 2025/0156261 A1 May 15, 2025

(51) Int. Cl.
*G06F 11/07* (2006.01)

(52) U.S. Cl.
CPC ...... *G06F 11/0772* (2013.01); *G06F 11/0736* (2013.01); *G06F 11/0781* (2013.01); *G06F 11/0784* (2013.01)

(58) Field of Classification Search
CPC ............. G06F 11/0736; G06F 11/0739; G06F 11/0766; G06F 11/0772; G06F 11/0781; G06F 11/0796; B60W 50/0205; B60W 2050/021; G05B 9/00; G05B 9/02; G05B 9/03; G05B 9/05; G05B 19/0428; G05B 19/048
See application file for complete search history.

(56) References Cited

U.S. PATENT DOCUMENTS 4,554,661 A * 11/1985 Bannister ............ G06F 11/0772 714/45
7,562,244 B2 7/2009 Wielage
2001/0034246 A1* 10/2001 Hutchison, IV ....... H04M 11/06 455/572
2018/0074991 A1 3/2018 Kumata
2020/0364174 A1 11/2020 Chandra et al.
2021/0397502 A1* 12/2021 Nautiyal ............. G06F 11/0793
2022/0122682 A1* 4/2022 Sharma .................. G11C 29/10
2023/0053582 A1* 2/2023 Muralidharan ..... G06F 11/0706
2024/0211336 A1* 6/2024 Injarapu .............. G06F 11/0784

FOREIGN PATENT DOCUMENTS

EP 3965110 A1 3/2022

* cited by examiner

*Primary Examiner* — Marc Duncan
*Assistant Examiner* — Albert Li

(57) ABSTRACT

A method for handling faults in an integrated circuit system includes receiving fault interface signals from safety-critical logic and generating a fault request indicating a fault and a domain identifier based on the fault interface signals. The fault interface signals include a fault signal and a fault domain identifier signal. In an embodiment of the method, the fault interface signals include synchronous signals received from the safety-critical logic using a synchronous interface and the synchronous signals include a fault clock signal. In an embodiment of the method, generating the fault request includes asserting the fault request in response to the fault signal having a first asserted signal level and maintaining assertion of the fault request until a fault acknowledgement is received from a fault collection and control circuit.

23 Claims, 9 Drawing Sheets

FAULT INTERFACE ARCHITECTURE IN SAFETY-RELEVANT SYSTEMS

BACKGROUND

Field of the Invention

This application relates to integrated circuits, in general, and more particularly to management of faults in integrated circuit systems.

Description of the Related Art

In general, integrated circuit systems include multiple processor cores and resources on a single chip, execute multiple applications at the same time, and can experience a substantial number of faults (e.g., software faults or hardware faults) during operation. In applications where safety is relevant (e.g., logic in an automotive system, aircraft guidance system, home security system, or industrial robotic system) or includes safety-critical logic (i.e., logic that may cause death or serious injury to people, equipment, property, or the environment if the logic fails or malfunctions), the system detects and recovers from a fault within a fault handling time interval to achieve fault-free or near fault-free operation. A typical safety-relevant system-on-a-chip (SoC) includes a fault collection and reaction system that categorizes faults and initiates appropriate reactions from the SoC. A conventional fault collection and reaction system relies on a central fault processor and software to handle faults from all applications. Thus, resources distributed across the SoC communicate fault information to the central fault processor for fault handing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A safety-relevant SoC that is partitioned into multiple self-contained subsystems includes a fault handling system for multiple fault generating domains. At least one of the fault generating domains includes a subsystem that provides fault interface signals that are synchronous fault signals accompanied by a fault clock signal. The fault handling system includes a fault interface that adapts fault interface signals to an asynchronous interface that transfers fault information using an exchange of signals that are not synchronized to a controlling clock signal. Instead, the fault interface transfers the fault information by handshaking using request and acknowledgement signals, thereby reducing routing of clock signals across the SoC and relaxing timing constraints of the SoC. In addition, the fault interface filters out false fault signals. The fault interface can be replicated as needed by an application.

Figure 1:
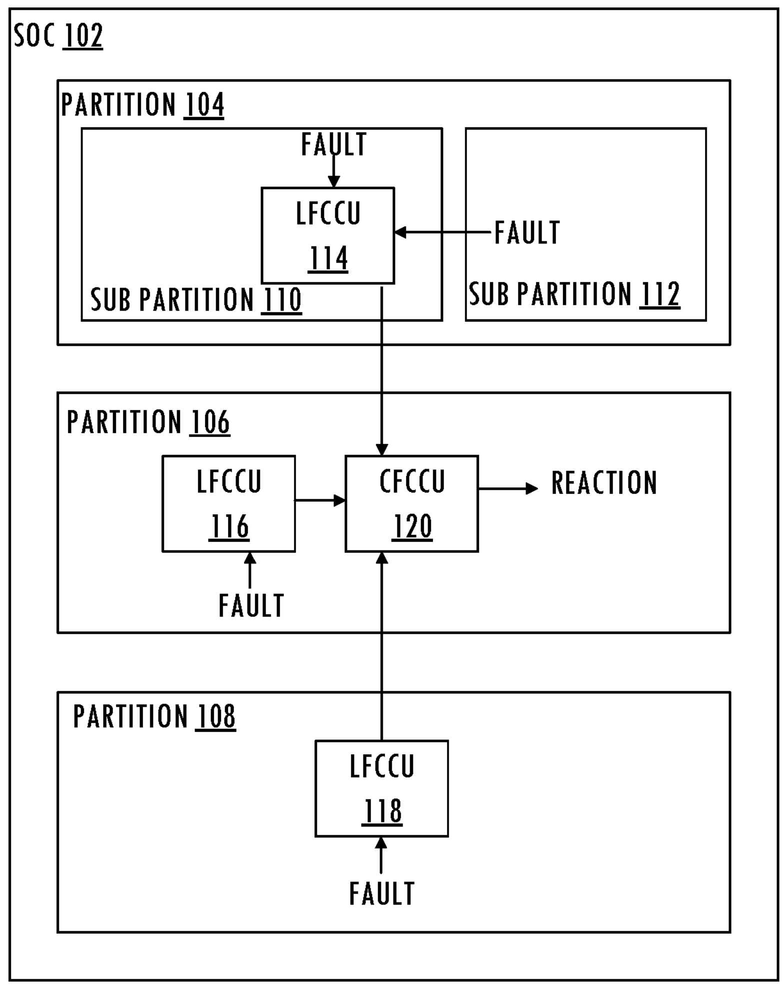
FIG. 1 illustrates a functional block diagram of an exemplary system-on-a-chip (SoC) including a fault collection and reaction system.

Referring to FIG. 1, a safety-relevant SoC is partitioned into multiple self-contained subsystems that have limited ports for interaction with other subsystems of the SoC. Each top level partition includes a local fault collection and control unit and may be further partitioned into subpartitions. A local fault collection and control unit is included in one of those subpartitions. The local fault collection and control unit receives faults from safety-aware subsystems (e.g., anti-locking braking subsystem, airbag control subsystem, or adaptive cruise control subsystem in automotive applications) within the partition and is responsible for aggregating faults from the subpartitions and sending the faults to a central fault collection and control unit in that subpartition or in another subpartition. The central fault collection and control unit is responsible for initiating an appropriate reaction to the fault condition, (e.g., reset or interrupt) by the SoC. FIG. 1 is exemplary only and other embodiments of an SoC include other numbers of partitions, subpartitions, and local fault collection and control units. In an embodiment, SoC 102 includes at least one processor executing one or more applications concurrently. In an embodiment, SoC 102 includes one application executing on one or more processors. Each processor is implemented by a central processing unit, processor, microprocessor, microcontroller, graphics processing unit, array processor, or other suitable circuit. Each application is associated with a corresponding domain identifier.

In an embodiment, safety relevant SoC 102 includes partition 104, partition 106, and partition 108, which are top-level partitions. Partition 104, partition 106, and partition 108 include local fault collection and control unit 114, local fault collection and control unit 116, and local fault collection and control unit 118, respectively. Partition 104 includes subpartition 110 and subpartition 112. Subpartition 110 and subpartition 112 provide fault information to local fault collection and control unit 114, which is included in subpartition 110. Local fault collection and control unit 114, local fault collection and control unit 116, and local fault collection and control unit 118 provide corresponding fault information to central fault collection and control unit 120, which is included in partition 106. Central fault collection and control unit 120 aggregates the faults and generates one or more control signals that initiate a reaction in SoC 102 that enables recovery from the faults.

An exemplary SoC includes nine or more top level partitions and each partition includes a local fault collection and control unit. Subpartitions in one of the partitions send all faults to the fault collection and control unit in another subpartition of the partition. Local fault collection and control units send outputs to the central fault collection and control unit using an interface that travels a substantial distance within the SoC. In some embodiments, the interface crosses partitions via feed through buffers since there is a common boundary between the partition including the central fault collection and control unit and the local fault collection and control unit. In an embodiment, an SoC communicates hundreds of faults having one or more different types from safety-aware logic to a local fault collection and control unit and approximately 50 or more faults from the local fault collection and control unit to the central fault collection and control unit. These numbers of faults increase with increases in complexity of fault detection schemes in safety-aware applications.

Figure 2:
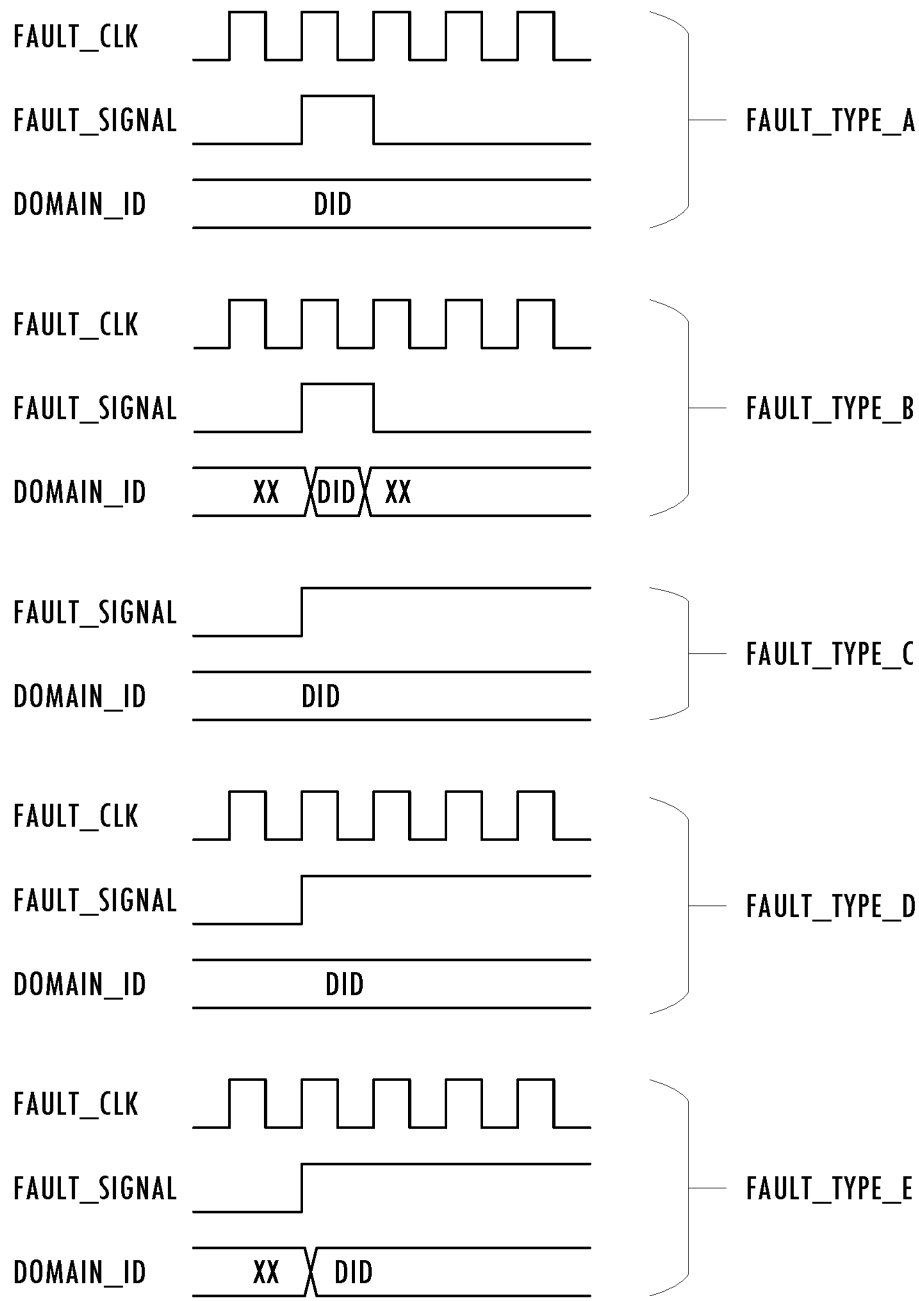
FIG. 2 illustrates exemplary timing diagrams for various types of fault signals of a fault collection and reaction system included in a system-on-a-chip (SoC).

FIG. 2 illustrates different types of fault interfaces that may be used in an SoC. In general, a safety-aware circuit indicates a fault condition by asserting a fault signal, e.g., asserting a pulse on a fault signal line and providing a corresponding fault clock signal or asserting an active level, and, in some cases, providing a corresponding fault clock signal on the fault signal line. Fault types A, B, D, and E use a synchronous interface, i.e., communicate a fault clock signal with the fault signal and the domain identifier, between safety-critical logic and a local fault collection and control unit and between a local fault collection and control unit and a central fault collection and control unit. Synchronous interfaces increase backend routing and the complexity of timing closure. In some embodiments, synchronous interfaces communicate faults at the rate of a source clock frequency and are captured according to a safe clock signal generated using a fast internal RC oscillator of the SoC. In embodiments of an SoC where the frequency of the source clock signal is substantially high as compared to the frequency of the safe clock signal, then the rate of pulse-like faults (e.g., FAULT_TYPE_A or FAULT_TYPE_B) can be substantially high and cannot be sent to a local fault collection and control unit and central fault collection and control unit without losses.

In at least one embodiment of a safety-aware SoC, in addition to the fault signal, which includes a fault indicator, a fault interface provides a corresponding domain identifier, which identifies the application executing on the SoC associated with the fault. In some embodiments, the fault interface also provides other fault information (e.g., a type of fault, a time at which the fault occurred, other parameters needed to characterize or reproduce one or more fault conditions). The domain identifier information provides interference protection where multiple applications execute on the same SoC. In at least one embodiment of the SoC, a fault interface drops a subsequent fault pulse having the same domain identifier as an earlier fault pulse that is still active. This allows the domain to recover from the fault before increasing the severity of a response to a fault. If a sample of a fault signal is asserted and associated with a domain identifier that is different from another domain identifier associated with a consecutive sample of the fault signal that is also asserted, then an overflow condition occurs. In at least one embodiment of an SoC, the fault collection and control unit receives fault signals that indicate current active faults and fault overflow conditions.

Figure 3:
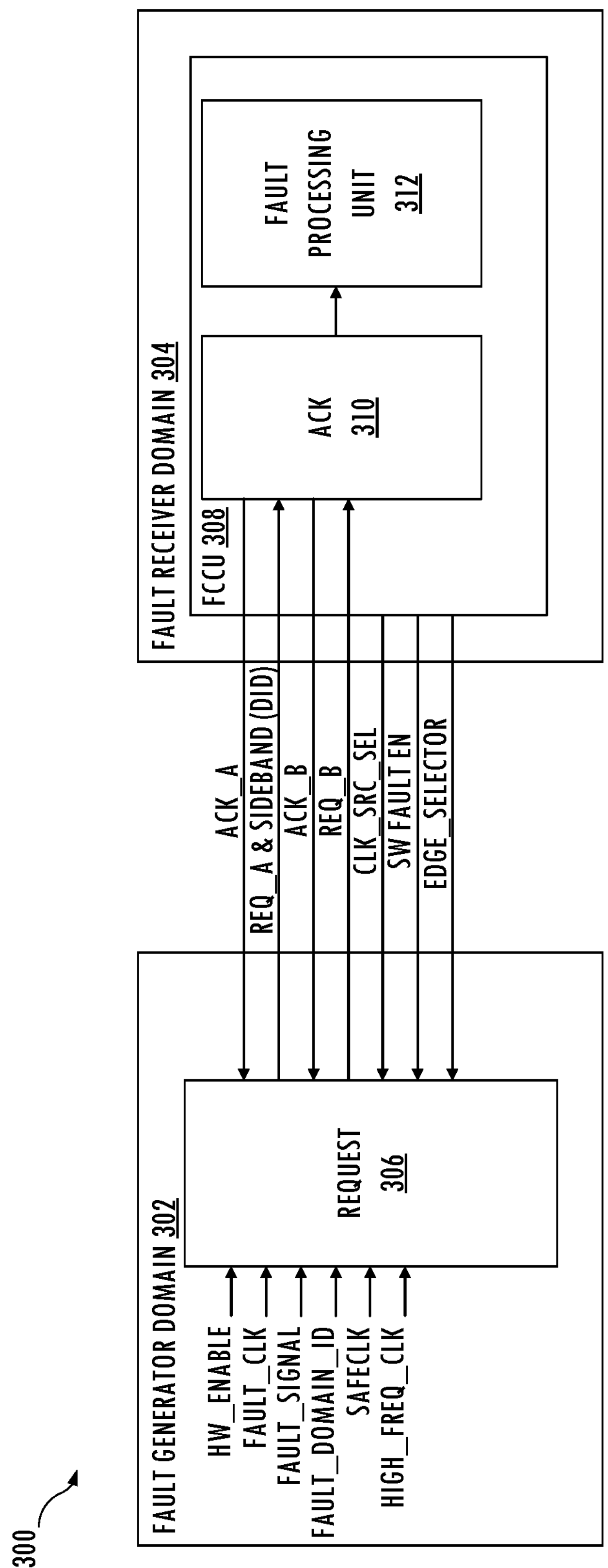
FIG. 3 illustrates a functional block diagram of an exemplary fault collection and reaction system with multiple asynchronous interfaces consistent with at least one embodiment of the invention.

Referring to FIG. 3, SoC 300 includes a fault interface that adapts those fault interface signals to an asynchronous interface that transfers fault information using an exchange of signals that are not synchronized to a controlling clock signal but rather transfers the fault information by handshaking using request and acknowledgement signals. SoC 300 includes fault generator domain 302, which is associated with safety-aware logic, and fault receiver domain 304, which is associated with fault collection and control unit 308. Rather than use a conventional synchronous interface (e.g., a FIFO based interface) that requires routing a fault clock signal. SoC 300 uses an asynchronous interface, i.e., a request and acknowledgement handshake to communicate fault information (e.g., a fault indication, a domain identifier, and a source overflow indicator) between fault generator domain 302 and fault receiver domain 304. In an embodiment of SoC 300, circuitry associated with fault generator domain 302 resides proximate to circuitry that generates the fault and circuitry associated with fault receiver domain 304 resides proximate to circuitry that receives the fault information (e.g., fault collection and control unit 308). The fault interface uses a limited number of ports.

Referring to FIGS. 1 and 3, in an embodiment of SoC 102 modified to use the fault interface that adapts fault interface signals to an asynchronous interface, a partition of the SoC (e.g., partition 104 of SoC 102 of FIG. 1) includes a fault generator domain in a first subpartition (e.g., in subpartition 112) and a fault receiver domain resides in a local fault collection and control unit of another subpartition (e.g., in local fault collection and control unit 114 of subpartition 110). Each local fault collection and control unit (e.g., local fault collection and control unit 114, local fault collection and control unit 116, or local fault collection and control unit 118) includes a fault generator domain that communicates with a fault receiver domain in a central fault collection and control unit in the same partition or another partition (e.g., in central fault collection and control unit 120 of partition 106).

Although circuitry that generates the fault operates at a high frequency and generates multiple faults, fault collection and control unit 308 handles only one fault at a time. Two consecutive samples of fault indicator FAULT_SIGNAL having an asserted level but associated with the same value of the fault domain identifier FAULT_DOMAIN_ID does not provide any additional information to fault collection and control unit 308 and is ignored by request generator circuit 306. However, request generator circuit 306 detects a fault overflow condition in response to detecting consecutive samples of fault indicator FAULT_SIGNAL having an asserted level but associated with different values of the fault domain identifier FAULT_DOMAIN_ID. Fault generator domain 302 asserts request REQ_A in response to detecting the fault. In an embodiment, fault generator domain 302 keeps request REQ_A asserted until an asserted value of fault indicator FAULT_SIGNAL and corresponding value of fault domain identifier FAULT_DOMAIN_ID are no longer captured by fault generator domain 302 and acknowledgement ACK_A has been received to confirm the reception of request REQ_A by fault collection and control unit 308. Acknowledgment ACK_A communicates the fault information to fault processing unit 312, which handles the fault and initiates a reaction by SoC 300.

In at least one embodiment, fault generator domain 302 transfers an indication of fault overflow using an additional asynchronous interface, which communicates an additional request and acknowledgement handshake. For example, fault generator domain 302 transfers the source overflow information for the additional fault using request REQ_B, in response to detecting the additional fault that occurs before the handshake associated with the first fault completes. Other signals communicated between fault generator domain 302 and fault receiver domain 304 (e.g., CLK_SRC_ SEL, SW_FAULT_EN, and EDGE_SELECTOR) are untimed or static signals and are provided from control registers in fault collection and control unit 308.

Figure 4A:
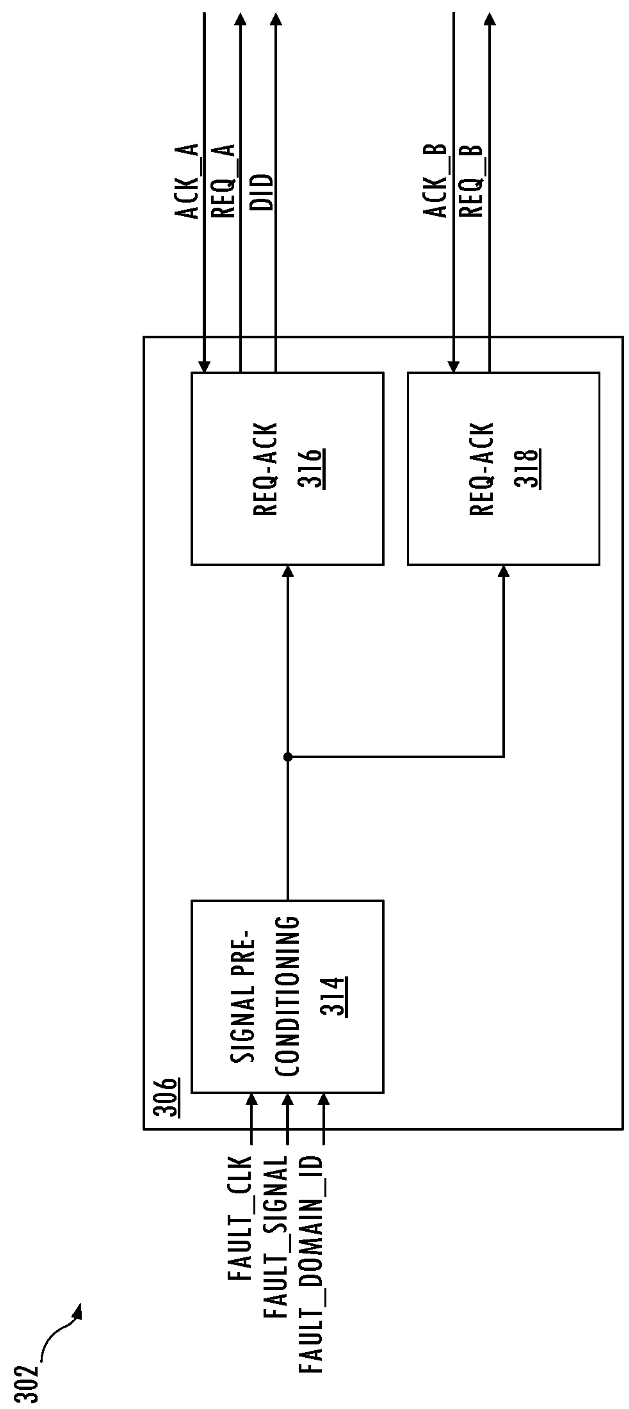
FIG. 4A illustrates a functional block diagram of exemplary fault generator domain logic for multiple asynchronous interfaces consistent with at least one embodiment of the invention.

Referring to FIG. 4A, in an embodiment, request generator domain 302 includes request generator circuit 306, which receives fault interface signals FAULT_CLK, FAULT_SIGNAL, and FAULT_DOMAIN_ID. Signal pre-conditioning circuit 314 performs edge selection, synchronization, and fault gating of the received fault interface signals for use by request-acknowledgement circuit 316 and request-acknowledgement circuit 318. Request-acknowledgement circuit 316 propagates the fault using request REQ_A and acknowledgment ACK_A. Request-acknowledgement circuit 318 propagates source overflow using request REQ_B and acknowledgment ACK_B.

Figure 4B:
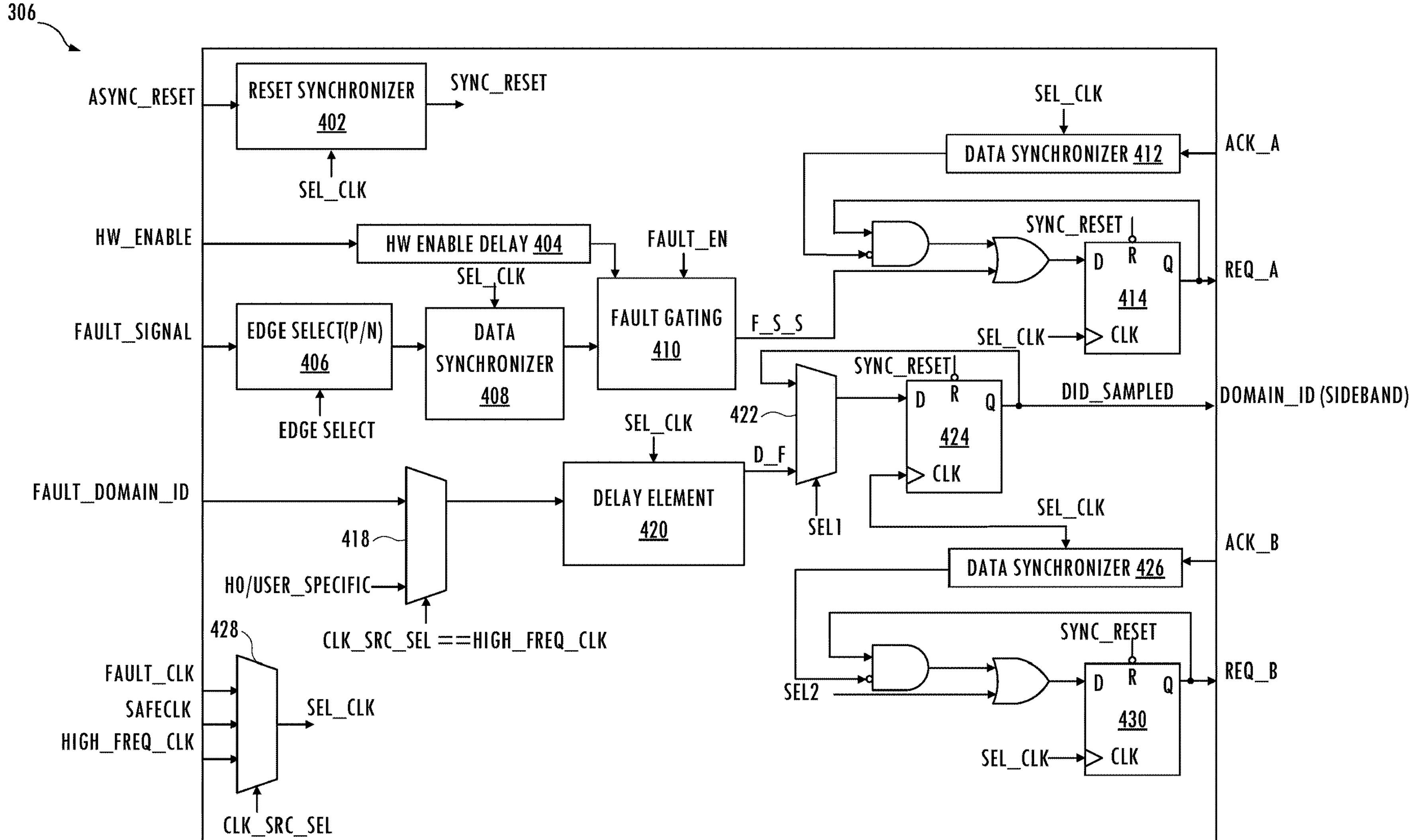
FIG. 4B illustrates a detailed functional block diagram of exemplary fault generator domain logic for multiple asynchronous interfaces consistent with at least one embodiment of the invention.

Referring to FIGS. 2, 3, and 4B, an embodiment of request generator circuit 306 uses multiplexer 428 to provide clock signal SEL_CLK, which is selected from clock signals FAULT_CLK, SAFECLK, and HIGH_FREQ_CLK according to control signal CLK_SRC_SEL received from fault receiver domain 304. For example, for fault types A, B, D, and E, control signal CLK_SRC_SEL selects clock signal FAULT_CLK. For fault type C, control signal CLK_SRC_ SEL selects clock signal SAFE_CLK. In the event of a mismatch of fault indicator FAULT_SIGNAL and clock signal FAULT_CLK, control signal CLK_SRC_SEL selects clock signal HIGH_FREQ_CLK for sampling, discussed further below. In an embodiment, software executing on the SOC writes a control register to indicate the selected clock signal. If state elements of request generator circuit 306 (e.g., flip-flop 414, flip-flop 424, and flip-flip 430) reset in response to control signal SYNC_RESET, which is a version of control signal ASYNC_RESET that is synchronized to clock signal SEL_CLK by reset synchronizer circuit 402. Request generator circuit 306 uses edge select circuit 406 to provide a positive or negative edge of fault indicator FAULT_SIGNAL according to control signal EDGE_SELECT received from fault receiver domain 304. Data synchronizer 408 synchronizes the positive or negative edge of fault indicator FAULT_SIGNAL to clock signal SEL_CLK. Fault gating circuit 410 provides the synchronized edge of the fault in response to the fault interface being enabled by FAULT_EN and a version of control signal HW_ENABLE delayed by hardware enable delay 404.

If control signal CLK_SRC_SEL selects clock signal HIGH_FREQ_CLK for sampling, then multiplexor 418 provides a value of zero for the domain identifier. Delay element 420 delays (e.g., using two delay stages) the value of the fault domain identifier provided by multiplexor 418, to generate signal D_F, which is a version of the fault domain identifier that is delayed and sampled using clock signal SEL_CLK. Signal D_F is sampled using clock signal SEL_CLK to generate signal DID_SAMPLED according to control signal SEL1. Multiplexer 422 uses control signal SEL1 to select an output from DID_SAMPLED and D_F. Flip-flop 424 provides the version of signal DID_ SAMPLED so long as control signal SEL1 is asserted. In an embodiment, control signal SEL1 is logically determined to update the output domain identifier based on whether a fault is being received and a prior request has been acknowledged (e.g., SEL1==F_S_S and NOT(REQ_A) AND NOT (ACK_A)).

Request generator circuit 306 receives acknowledgement ACK_A and acknowledgement ACK_B from fault receiver domain 304 and synchronizes those acknowledgement signals to clock signal SEL_CLK using data synchronizer 412 and data synchronizer 426, respectively. Flip-flop 414 provides request REQ_A, which is asserted synchronous to clock signal SEL_CLK in response to fault indication F_S_S or in response to a prior fault request that has not yet been acknowledged, i.e., request REQ_A, being asserted so long as acknowledgement ACK_A is not received. In an embodiment, control signal SEL_2 asserts an overflow indication (e.g., SEL2==F_S_S and NOT(REQ_B OR ACK_B) AND (D_F!=DID_SAMPLED)). Accordingly, flip-flop 430 provides request REQ_B asserted synchronous to SEL_CLK in response to SEL_2 so long as acknowledgement ACK_B is not received and request REQ_B being asserted. After acknowledgement ACK_A or acknowledgement ACK_B is asserted, it remains asserted until a few cycles after the corresponding request is deasserted.

Figure 5:
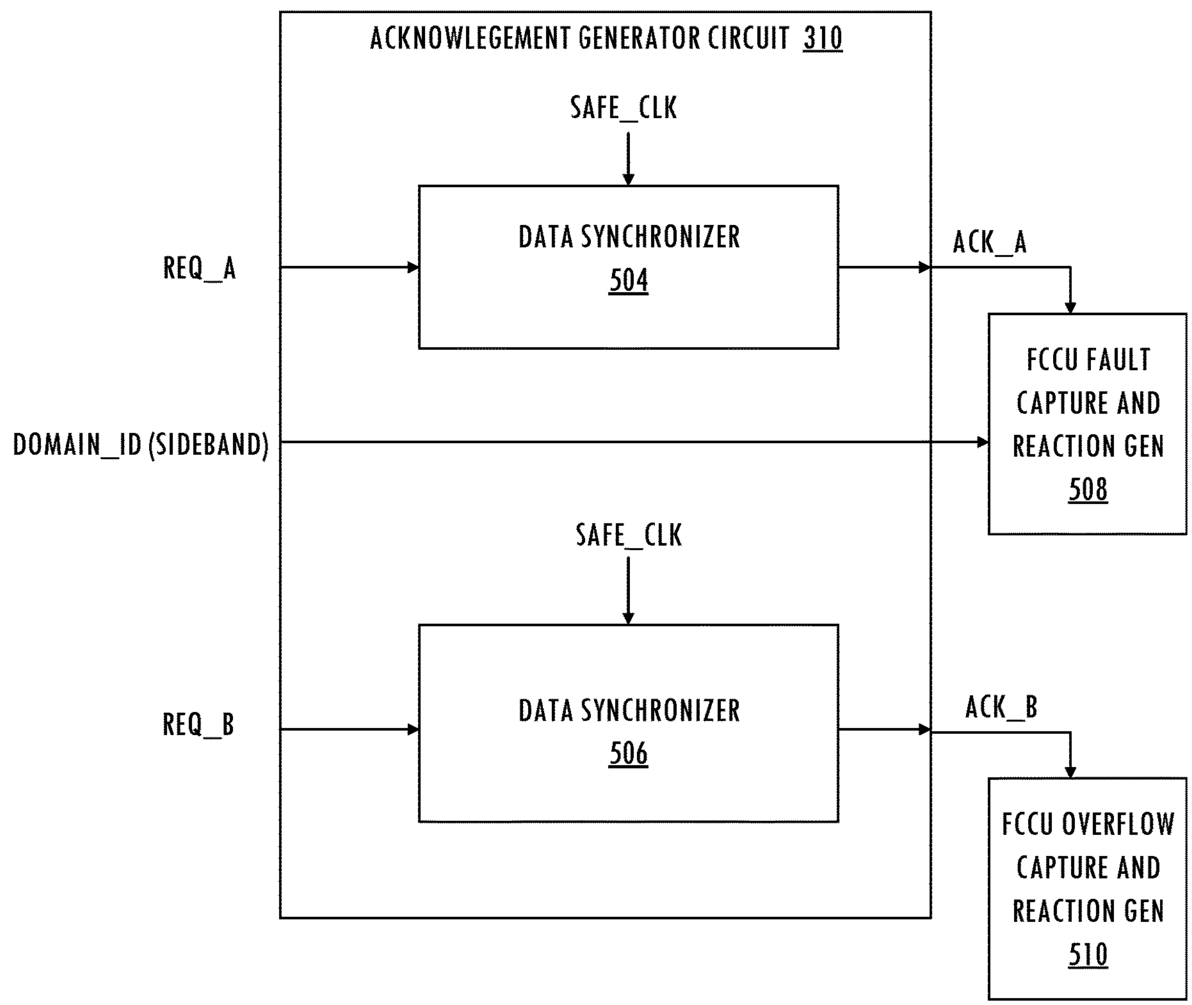
FIG. 5 illustrates a functional block diagram of an exemplary fault receiver domain logic for multiple asynchronous interfaces consistent with at least one embodiment of the invention.

Referring to FIG. 5, in at least one embodiment, acknowledgment generator circuit 310 includes a data synchronization circuit for each of two asynchronous interfaces of the request generator circuit. For example, data synchronizer 504 and data synchronizer 506 are two-stage circuits that generate acknowledgement ACK_A and acknowledgement ACK_B, respectively, synchronous to clock signal SAFE_ CLK and are based on request REQ_A and request REQ_B, respectively. Acknowledgment generator circuit 310 passes acknowledgement ACK_A and domain identifier DOMAIN_ID, unchanged, to fault capture and reaction generation circuit 508 of the fault collection and control unit. In an embodiment, domain identifier DOMAIN_ID is communicated using the same signal line as request REQ_A, but in a sideband of request REQ_A. Acknowledgment generator circuit 310 passes acknowledgement ACK_B to an overflow capture and reaction generation circuit 510 of the fault collection and control unit. Fault capture and reaction generation circuit 508 captures the sideband information concurrently with assertion of acknowledgement ACK_A.

Figure 6:
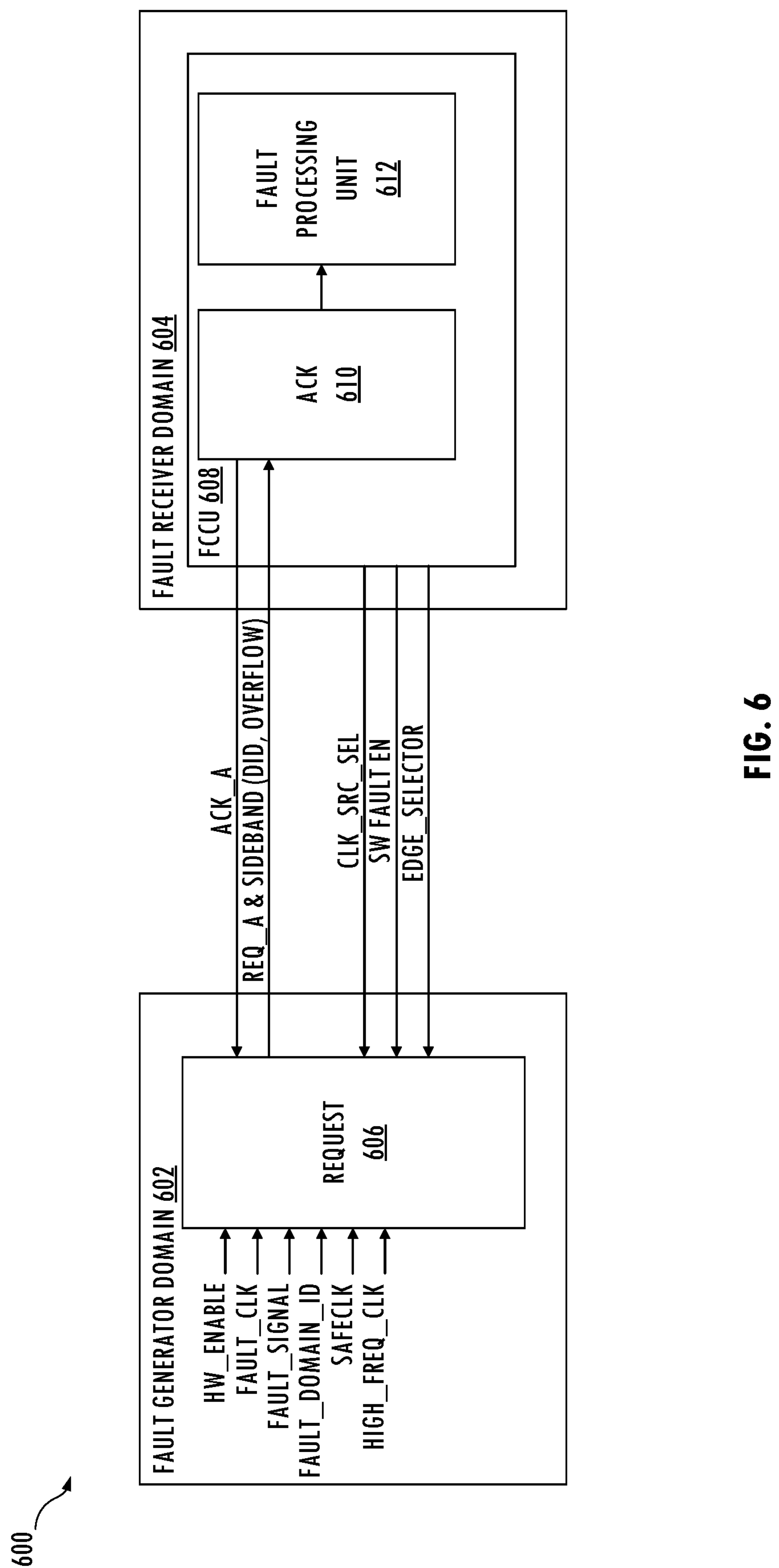
FIG. 6 illustrates a functional block diagram of an exemplary fault collection and reaction system for a single asynchronous interface consistent with at least one embodiment of the invention.

Referring to FIG. 6, in at least one embodiment, SoC 600 includes fault generator domain 602, which is associated with safety-aware logic, and fault receiver domain 604, which is associated with fault collection and control unit 608. Rather than use a conventional synchronous interface that requires routing a fault clock signal, SoC 600 uses an asynchronous interface to communicate a fault indication, a domain identifier, and an overflow indication from fault generator domain 602 to fault receiver domain 604. Fault generator domain 602 asserts request REQ_A in response to detecting a fault using fault indicator FAULT_SIGNAL. In an embodiment, fault generator domain 602 keeps request REQ_A asserted until the fault indicator and domain identifier are no longer captured by fault generator domain 602 on signal fault indicator FAULT_SIGNAL and domain identifier DOMAIN_ID, respectively, and acknowledgement is no longer being asserted by acknowledgement ACK_A to confirm reception of the fault. Fault processing unit 612 further processes the fault and initiates a reaction by SoC 600. In an embodiment, fault processing unit 612 increases the severity of a reaction to a fault, which may increase software recovery time, when an overflow condition occurs.

In at least one embodiment, fault generator domain 602 communicates domain identifier DOMAIN_ID using the same signal line as request REQ_A, but in a sideband of fault indicator of request REQ_A. In addition, fault generator domain 602 communicates a source overflow signal as another sideband signal of request REQ_A. Other signals communicated between fault generator domain 602 and fault receiver domain 604 (e.g., CLK_SRC_SEL, SW_FAULT_EN, and EDGE_SELECT) are untimed or are static signals provided from control registers in fault collection and control unit 608.

Figure 7:
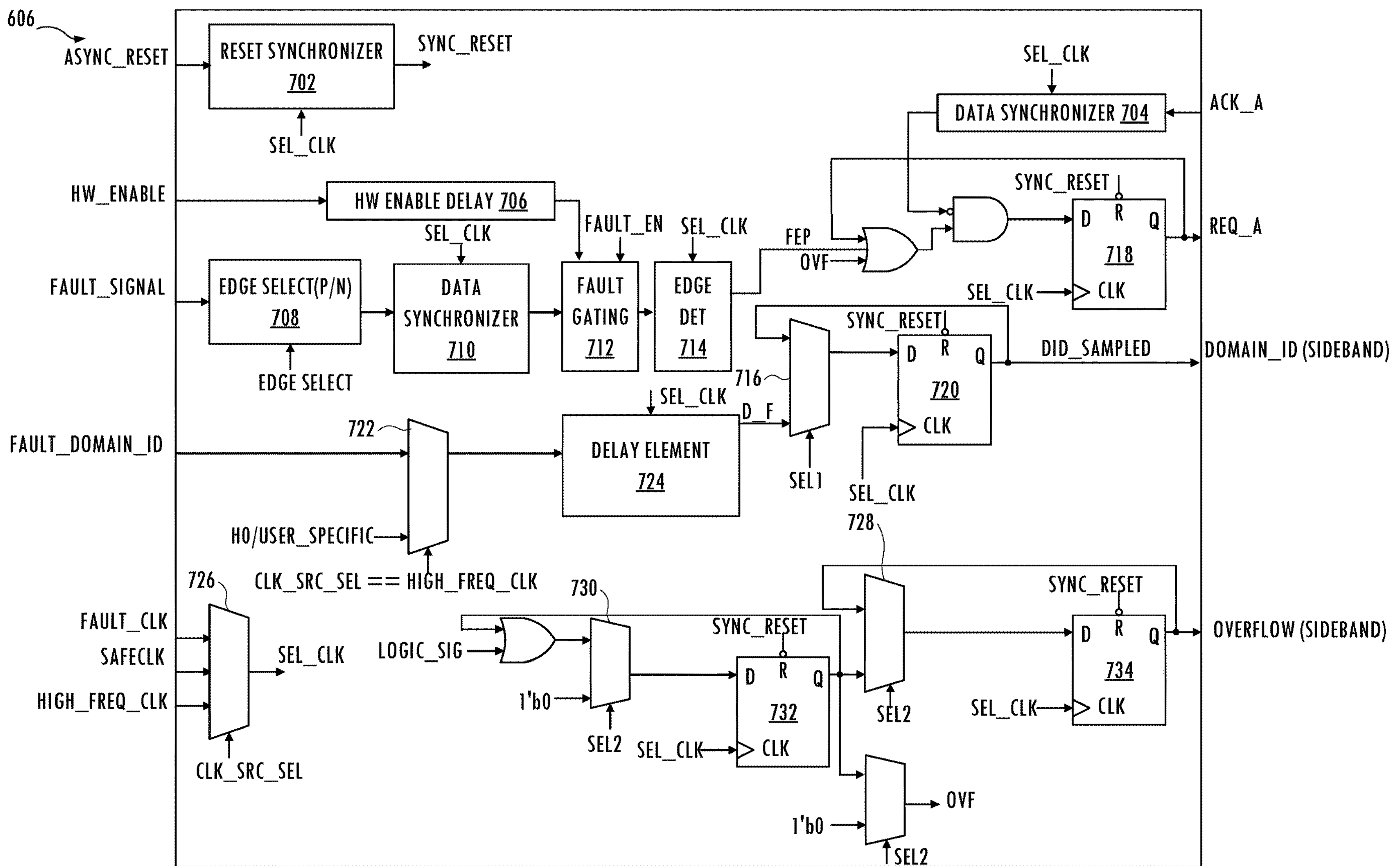
FIG. 7 illustrates a functional block diagram of an exemplary fault generator domain logic for a single asynchronous interface consistent with at least one embodiment of the invention.

Referring to FIGS. 6 and 7, in an embodiment, request generator circuit 606 uses multiplexer 726 to provide clock signal SEL_CLK, which is selected from clock signals FAULT_CLK, SAFECLK, and HIGH_FREQ_CLK according to control signal CLK_SRC_SEL received from fault receiver domain 604. State elements of request generator circuit 606 (e.g., flip-flop 718, flip-flop 720, flip-flop 732, and flip-flip 734) are reset in response to control signal SYNC_RESET, which is a version of control signal ASYNC_RESET that is synchronized to clock signal SEL_CLK by reset synchronizer circuit 702. Data synchronizer 710 synchronizes the positive or negative edge of fault indicator FAULT_SIGNAL, as provided in a signal generated by edge selector 708 according to control signal EDGE_SELECT received from fault receiver domain 604, to clock signal SEL_CLK. Fault gating circuit 712 and edge detector 714 provide a detected synchronized edge of the fault in response to the fault interface being enabled by FAULT_EN and a version of control signal HW_ENABLE delayed by hardware enable delay 706.

If control signal CLK_SRC_SEL selects clock signal HIGH_FREQ_CLK for sampling, then multiplexor 722 provides a value of zero for the fault domain identifier. Delay element 724 delays (e.g., using three delay stages) fault domain identifier received from multiplexor 722, to generate signal D_F, which is a version of the fault domain identifier that is delayed and sampled using clock signal SEL_CLK. Signal D_F is sampled using clock signal SEL_CLK to generate signal DID_SAMPLED according to control signal SEL1. Multiplexer 716 uses control signal SEL1 to select an output from DID_SAMPLED and D_F. Flip-flop 720 provides the version of signal DID_SAMPLED so long as fault indicator FAULT_SIGNAL is asserted. In an embodiment, control signal SEL1 is logically determined to update the output domain identifier based on whether a fault is being received and a prior request has been acknowledged (e.g., SEL1==F_S_S and NOT(REQ_A) AND NOT(ACK_A)).

Request generator circuit 606 receives acknowledgment ACK_A from fault receiver domain 604 and synchronizes those signals to clock signal SEL_CLK using data synchronizer 704. Flip-flop 718 provides request REQ_A, which is asserted synchronous to clock signal SEL_CLK to indicate a fault request or an overflow fault request in response to an asserted value of signal OVF, signal FEP, or a prior indication of a fault being asserted, so long as acknowledgement ACK_A is not asserted. When request REQ_A and acknowledgement ACK_A are deasserted as indicated by control signal SEL2 (e.g., SEL2==!ACK_A and !_REQ_A), multiplexor 730 provides signal LOGIC_SIG (e.g., LOGIC_SIG=FEP AND (REQ_A OR ACK_A) AND (DID_DELAYED!=DID_SAMPLED), in response to control signal SEL2. Flip-flop 732 stores an overflow request while the previous fault is still being transferred using the request REQ_A and acknowledgement ACK_A interface. Multiplexor 728 provides that sampled version of signal LOGIC_SIG or the prior overflow signal OVERFLOW in a sideband of request REQ_A to flip-flop 734 when request REQ_A and acknowledgement ACK_A are deasserted (e.g., SEL2==!ACK_A and !_REQ_A). In an embodiment, a new overflow condition or a prior overflow condition is asserted using control signal LOGIC_SIG, which is asserted in response to fault edge pulse signal (e.g., LOGIC_SIG=FEP AND (REQ_A OR ACK_A) AND (DID_DELAYED!=DID_SAMPLED)) and control signal SEL2 determined according to (e.g., SEL2==!REQ_A and !ACK_A).

Figure 8:
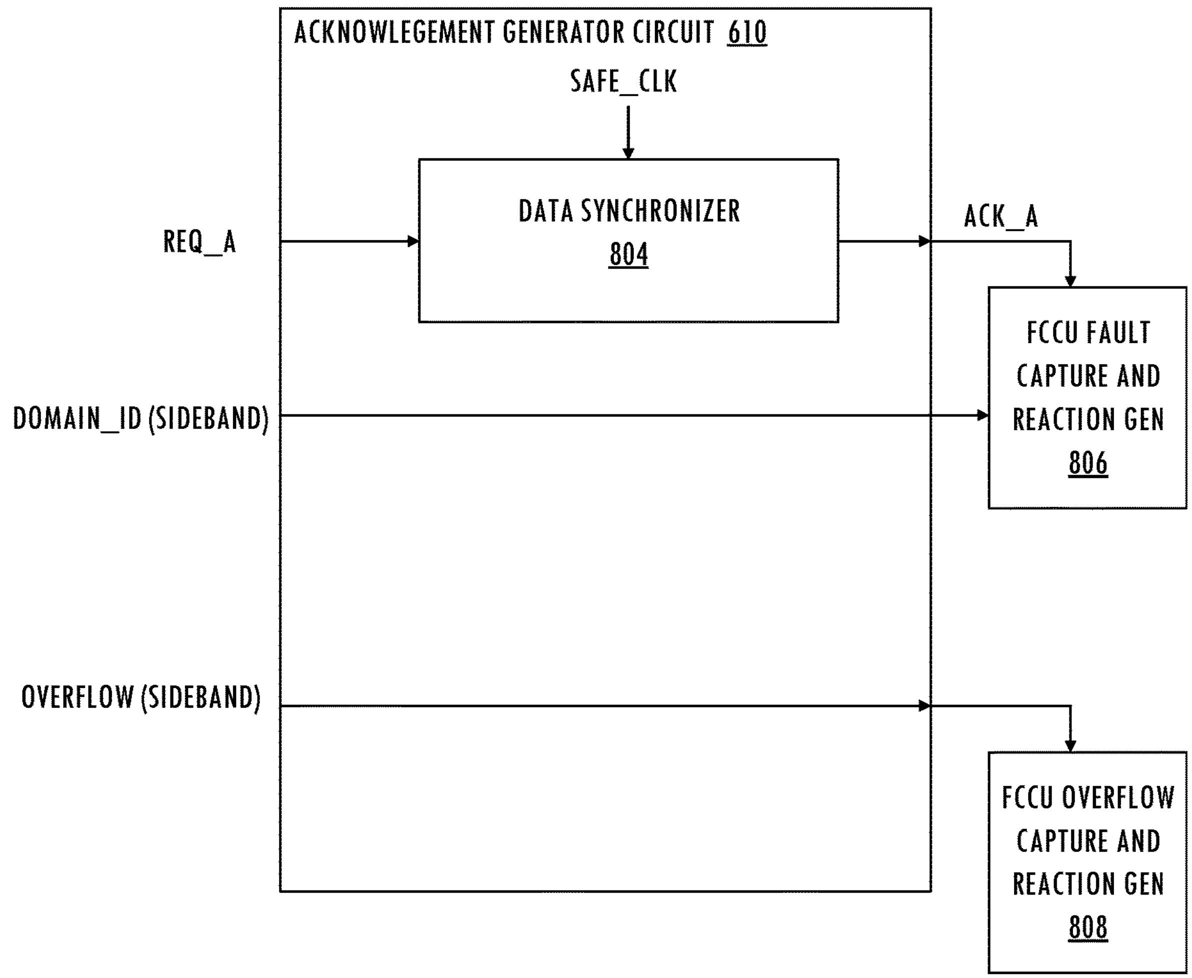
FIG. 8 illustrates a functional block diagram of an exemplary fault receiver domain logic for a single asynchronous interface consistent with at least one embodiment of the invention.

Referring to FIGS. 6 and 8, in at least one embodiment, acknowledgment generator circuit 610 includes a data synchronization circuit for the fault interface. For example, data synchronizer 804 is a two-stage circuit that generates acknowledgement ACK_A synchronous to clock signal SAFE_CLK and is generated based on a fault indicator of request REQ_A received from fault generator domain 602. Acknowledgment generator circuit 610 passes domain identifier DOMAIN_ID recovered from a sideband of request REQ_A, unchanged, and acknowledgement ACK_A to fault capture and reaction generation circuit 806 of the fault collection and control unit. Acknowledgment generator circuit 610 passes overflow indicator recovered from a sideband of request REQ_A to overflow capture and reaction generator 808 in the fault collection and control unit.

Referring to FIGS. 3 and 6, in at least one embodiment, an SoC includes control signal HW_ENABLE that selectively enables sampling of fault interface signals by a request generator circuit. In at least one embodiment of the fault interface, counter-based delay logic delays fault sampling of fault interface signals by the request generator circuit. In an embodiment, assertion of control signal HW_ENABLE triggers delay logic including a counter that counts to a predetermined value before sampling the synchronous signals by the fault interface. In response to the counter value reaching the predetermined value, the delay logic enables sampling of the fault interface signals by the request generator circuit. Deassertion of control signal HW_ENABLE disables request generator circuit 904 and resets the counter to an initial value. In at least one embodiment of an SoC, the predetermined value is used to handle a fault that originates in an analog circuit or off-chip and that requires a warmup time. For example, a high-speed interface used to communicate between integrated circuits on a printed circuit board uses open drain voltage detection. During a warm-up time, the open drain voltage detector may cause a fault line to glitch. The hardware enable functionality ensures that the SoC ignores glitches of the fault indicator prior to asserting control signal HW_ENABLE, thereby reducing or eliminating false fault detection. In addition, the hardware enable functionality may be used to mask faults during a self-test of the SoC or during a reset of the SoC.

In at least one embodiment of an SoC, a high frequency clock signal that is available externally and is provided to the SoC as clock signal HIGH_FREQ_CLK (e.g., a phase-locked loop clock signal or high frequency ring oscillator signal). In an exemplary automotive application, a free-running ring oscillator available in a partition is used by request circuit. If clock signal FAULT_CLK and fault indicator FAULT_SIGNAL are mismatched at the fault interface (e.g., due to routing mismatches), the fault can still be sampled by the fault interface using clock signal HIGH_FREQ_CLK. If fault indicator FAULT_SIGNAL is more than two cycles of the phase-locked loop clock signal, then the request circuit will be able to capture the fault and notify a corresponding fault collection and control unit of the fault. However, under these circumstances, the request circuit may be unable to correctly capture fault domain identifier FAULT_DOMAIN_ID and the request circuit drives a default value (e.g., '0'). Accordingly, at least the fault is captured and reported to the fault collection and control unit.

Thus, techniques for asynchronously communicating fault information on an SoC have been described. The techniques reduce routing of high frequency clock signals across the SoC, thereby reducing cost and relaxing timing constraints of fault signaling. In this specification, example embodiments have been presented in terms of a selected set of details. However, a person of ordinary skill in the art would understand that many other example embodiments may be practiced which include a different selected set of these details. It is intended that the following claims cover all possible example embodiments. Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

In an embodiment, a method for handling faults in an integrated circuit system includes receiving fault interface signals from safety-critical logic and generating a fault request indicating a fault and a domain identifier based on the fault interface signals. The fault interface signals include a fault signal and a fault domain identifier signal.

In an embodiment of the method, the fault interface signals include synchronous signals received from the safety-critical logic using a synchronous interface and the synchronous signals include a fault clock signal.

In an embodiment of the method, generating the fault request comprises sampling the fault signal and the fault domain identifier signal using a high frequency clock signal in response to a signal mismatch of the fault clock signal and the fault signal.

In an embodiment of the method, generating the fault request includes asserting the fault request in response to the fault signal having a first asserted signal level and maintaining assertion of the fault request until a fault acknowledgement is received from a fault collection and control circuit.

In an embodiment, the method further includes asserting an overflow indicator in response to consecutive samples of the fault signal being asserted and corresponding consecutive samples of the fault domain identifier signal having different domain identifier values. The overflow indicator is not asserted otherwise.

In an embodiment, the method further includes communicating the fault request using a first asynchronous interface and communicating the overflow indicator using a sideband signal of the fault request of the first asynchronous interface or a second asynchronous interface.

In an embodiment, the method includes deasserting the fault request in response to receiving a fault acknowledgement from a fault collection and control unit.

In an embodiment of the method, generating the fault request includes sampling the fault signal and the fault domain identifier signal after expiration of a predetermined delay.

In at least one embodiment, a fault handling system in an integrated circuit system includes a request generator circuit configured to receive fault interface signals from a first subsystem of a plurality of subsystems and to generate a fault request indicating a fault and a domain identifier based on the fault interface signals. The fault interface signals a fault signal and a fault domain identifier signal. The fault handling system includes an acknowledgement generator circuit configured to generate a fault acknowledgement in response to the fault request.

In an embodiment of the fault handling system, the fault interface signals are synchronous signals received from the first subsystem using a synchronous interface and the fault interface signals further include a fault clock signal.

In an embodiment of the fault handling system, the request generator circuit is configured to generate the fault request by sampling the fault signal and the fault domain identifier signal using a high frequency clock signal in response to a signal mismatch of the fault clock signal and the fault signal.

In an embodiment of the fault handling system, the request generator circuit is configured to generate an overflow indicator corresponding to an overflow condition of the fault interface signals. The acknowledgement generator circuit is configured to generate a second fault acknowledgement in response to the overflow indicator.

In an embodiment of the fault handling system, the request generator circuit is configured to assert the fault request in response to the fault signal having a first asserted signal level and to maintain assertion of the fault request until a fault acknowledgement is received.

In an embodiment of the fault handling system, the request generator circuit is further configured to assert an overflow indicator in response to consecutive samples of the fault signal being asserted and corresponding consecutive samples of the fault domain identifier signal having different domain identifier values and to deassert the overflow indicator in response to the consecutive samples of the fault signal being asserted and the corresponding consecutive samples of the fault domain identifier signal having the same domain identifier value.

In an embodiment of the fault handling system, the request generator circuit is further configured to communicate the fault request to the acknowledgement generator circuit using a first asynchronous interface. The request generator circuit is further configured to communicate the overflow indicator to the acknowledgement generator circuit as a sideband signal of the fault request or using a second asynchronous interface.

In an embodiment, the fault handling system further includes a fault collection and control unit having the acknowledgment generator circuit and a fault processing unit configured to initiate a reaction to fault information associated with the fault request.

In an embodiment of the fault handling system, the plurality of subsystems is a plurality of local fault collection and control units.

In an embodiment of the fault handling system, the plurality of subsystems is a plurality of applications executing using at least one processor.

In an embodiment of the fault handling system, the request generator circuit is configured to generate the fault request by sampling the fault signal and the fault domain identifier signal after expiration of a predetermined delay.

In at least one embodiment, a system-on-a-chip includes a first integrated circuit partition of a plurality of integrated circuit partitions. The first integrated circuit partition includes logic configured to generate fault interface signals including a fault signal and a fault domain identifier signal. The first integrated circuit partition includes a fault generation request circuit configured to generate a fault request indicating a fault and a domain identifier based on the fault interface signals received from the logic. The system-on-a chip includes a central fault collection control unit of the plurality of integrated circuit partitions, the central fault collection control unit being configured to receive the fault request, generate a fault acknowledgment in response to receiving the fault request, and initiate a reaction to fault request.

What is claimed is:

1. A method for handling faults in an integrated circuit system, the method comprising:

receiving fault interface signals from safety-critical logic; and generating a fault request indicating a fault and a domain identifier based on the fault interface signals, wherein the fault interface signals include a fault signal and a fault domain identifier signal, wherein the fault interface signals include synchronous signals received from the safety-critical logic using a synchronous interface and the synchronous signals include a fault clock signal, and wherein generating the fault request comprises sampling the fault signal and the fault domain identifier signal using a high frequency clock signal in response to a signal mismatch of the fault clock signal and the fault signal.

2. The method as recited in claim 1 wherein generating the fault request comprises:

asserting the fault request in response to the fault signal having a first asserted signal level; and maintaining assertion of the fault request until a fault acknowledgement is received from a fault collection and control circuit.

3. The method as recited in claim 1 further comprising:

asserting an overflow indicator in response to consecutive samples of the fault signal being asserted and corresponding consecutive samples of the fault domain identifier signal having different domain identifier values, the overflow indicator not being asserted otherwise.

4. The method as recited in claim 1 further comprises deasserting the fault request in response to receiving a fault acknowledgement from a fault collection and control unit.

5. The method as recited in claim 1 wherein generating the fault request comprises sampling the fault signal and the fault domain identifier signal after expiration of a predetermined delay.

6. A method for handling faults in an integrated circuit system, the method comprising:

receiving fault interface signals from safety-critical logic; and generating a fault request indicating a fault and a domain identifier based on the fault interface signals, wherein the fault interface signals include a fault signal and a fault domain identifier signal;

asserting an overflow indicator in response to consecutive samples of the fault signal being asserted and corresponding consecutive samples of the fault domain identifier signal having different domain identifier values, the overflow indicator not being asserted otherwise;

communicating the fault request using a first asynchronous interface; and communicating the overflow indicator using a sideband signal of the fault request of the first asynchronous interface or a second asynchronous interface.

7. The method as recited in claim 6 wherein generating the fault request comprises:

asserting the fault request in response to the fault signal having a first asserted signal level; and maintaining assertion of the fault request until a fault acknowledgement is received from a fault collection and control circuit.

8. The method as recited in claim 6 further comprises deasserting the fault request in response to receiving a fault acknowledgement from a fault collection and control unit.

9. The method as recited in claim 6 wherein generating the fault request comprises sampling the fault signal and the fault domain identifier signal after expiration of a predetermined delay.

10. A fault handling system in an integrated circuit system comprising:

a request generator circuit configured to receive fault interface signals from a first subsystem of a plurality of subsystems and to generate a fault request indicating a fault and a domain identifier based on the fault interface signals, the fault interface signals including a fault signal and a fault domain identifier signal; and an acknowledgement generator circuit configured to generate a fault acknowledgement in response to the fault request, wherein the request generator circuit is further configured to assert an overflow indicator in response to consecutive samples of the fault signal being asserted and corresponding consecutive samples of the fault domain identifier signal having different domain identifier values and to deassert the overflow indicator in response to the consecutive samples of the fault signal being asserted and the corresponding consecutive samples of the fault domain identifier signal having the same domain identifier value, wherein the request generator circuit is further configured to communicate the fault request to the acknowledgement generator circuit using a first asynchronous interface, and wherein the request generator circuit is further configured to communicate the overflow indicator to the acknowledgement generator circuit as a sideband signal of the fault request or using a second asynchronous interface.

11. The fault handling system, as recited in claim 10, wherein the request generator circuit is configured to generate a second overflow indicator corresponding to an overflow condition of the fault interface signals, and wherein the acknowledgement generator circuit is configured to generate a second fault acknowledgement in response to the second overflow indicator.

12. The fault handling system, as recited in claim 10 wherein the request generator circuit is configured to assert the fault request in response to the fault signal having a first asserted signal level and to maintain assertion of the fault request until the fault acknowledgement is received.

13. The fault handling system, as recited in claim 10 further comprising:

a fault collection and control unit comprising:

the acknowledgment generator circuit; and a fault processing unit configured to initiate a reaction to fault information associated with the fault request.

14. The fault handling system, as recited in claim 10, wherein the plurality of subsystems is a plurality of local fault collection and control units.

15. The fault handling system, as recited in claim 10, wherein the plurality of subsystems is a plurality of applications executing using at least one processor.

16. The fault handling system, as recited in claim 10, wherein the request generator circuit is configured to generate the fault request by sampling the fault signal and the fault domain identifier signal after expiration of a predetermined delay.

17. A fault handling system in an integrated circuit system comprising:

a request generator circuit configured to receive fault interface signals from a first subsystem of a plurality of subsystems and to generate a fault request indicating a fault and a domain identifier based on the fault interface signals, the fault interface signals including a fault signal and a fault domain identifier signal; and an acknowledgement generator circuit configured to generate a fault acknowledgement in response to the fault request, wherein the fault interface signals are synchronous signals received from the first subsystem using a synchronous interface and the fault interface signals further include a fault clock signal, and wherein the request generator circuit is configured to generate the fault request by sampling the fault signal and the fault domain identifier signal using a high frequency clock signal in response to a signal mismatch of the fault clock signal and the fault signal.

18. The fault handling system, as recited in claim 17, wherein the request generator circuit is configured to generate an overflow indicator corresponding to an overflow condition of the fault interface signals, and wherein the acknowledgement generator circuit is configured to generate a second fault acknowledgement in response to the overflow indicator.

19. The fault handling system, as recited in claim 17 wherein the request generator circuit is configured to assert the fault request in response to the fault signal having a first asserted signal level and to maintain assertion of the fault request until the fault acknowledgement is received.

20. The fault handling system, as recited in claim 17 further comprising:

a fault collection and control unit comprising:

the acknowledgment generator circuit; and a fault processing unit configured to initiate a reaction to fault information associated with the fault request.

21. The fault handling system, as recited in claim 17, wherein the plurality of subsystems is a plurality of local fault collection and control units.

22. The fault handling system, as recited in claim 17, wherein the plurality of subsystems is a plurality of applications executing using at least one processor.

23. The fault handling system, as recited in claim 17, wherein the request generator circuit is configured to generate the fault request by sampling the fault signal and the fault domain identifier signal after expiration of a predetermined delay.

* * * * *